(12) United States Patent
Morgan et al.

(10) Patent No.: US 8,616,172 B2
(45) Date of Patent: Dec. 31, 2013

(54) ENGINE BALANCE MASSES AND DRIVES

(75) Inventors: Patrick B. Morgan, New Baltimore, MI (US); Kenneth L. Nowaczyk, Algonac, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/528,309

(22) Filed: Jun. 20, 2012

(65) Prior Publication Data
US 2012/0255514 A1 Oct. 11, 2012

Related U.S. Application Data

(63) Continuation of application No. 12/567,401, filed on Sep. 25, 2009, now Pat. No. 8,210,148.

(51) Int. Cl.
*F02B 75/06* (2006.01)
(52) U.S. Cl.
USPC .............. 123/192.2; 123/192.1; 74/603
(58) Field of Classification Search
USPC .............. 123/192.1, 192.2; 74/603, 604
See application file for complete search history.

(56) References Cited

U.S. PATENT DOCUMENTS

| 3,990,325 | A | 11/1976 | Bueren |
| 4,305,352 | A | 12/1981 | Oshima et al. |
| 4,489,683 | A | 12/1984 | Tsai et al. |
| 4,576,060 | A | 3/1986 | Gristina |
| 4,644,916 | A * | 2/1987 | Kitagawa .................. 123/192.2 |
| 5,327,859 | A * | 7/1994 | Pierik et al. ................ 123/90.17 |
| 5,375,571 | A | 12/1994 | Diehl et al. |
| 6,397,809 | B1 | 6/2002 | Sayama et al. |
| 6,718,934 | B2 * | 4/2004 | Ohsawa .................... 123/192.2 |
| 6,868,515 | B2 | 3/2005 | Hanson |
| 7,307,958 | B2 * | 12/2007 | Lee et al. ...................... 370/252 |
| 7,363,904 | B2 * | 4/2008 | Utsumi et al. ............ 123/196 R |
| 7,607,958 | B1 * | 10/2009 | Hochmayr et al. ............ 440/75 |
| 7,657,728 | B2 | 2/2010 | Johnson |
| 2004/0084006 | A1 | 5/2004 | Lawrence |
| 2006/0130797 | A1 | 6/2006 | Klotz et al. |
| 2007/0012277 | A1 | 1/2007 | Mott |
| 2007/0056544 | A1 | 3/2007 | Purcilly et al. |

* cited by examiner

*Primary Examiner* — Noah Kamen
*Assistant Examiner* — Long T Tran
(74) *Attorney, Agent, or Firm* — Julia Voutyras; Alleman Hall McCoy Russell & Tuttle LLP

(57) ABSTRACT

The present application relates to a drive and balance mass. In one example, an engine includes, a camshaft, a balance shaft disposed within an interior of the camshaft, and a first gear, intermediate the balance shaft and the camshaft and driving the balance shaft to rotate about a first axis substantially parallel to a crankshaft of the engine in a direction opposite of the crankshaft. In another example, a balance mass and drive for an engine includes a planetary gear set including a sun gear, a ring gear and a plurality of pinions mounted on a carrier, an input coupled to an input gear of the planetary gear set, a balance mass coupled to an output gear of the planetary gear set, the output gear configured to drive the balance mass to rotate about a first axis substantially parallel to the crankshaft in a direction opposite of the crankshaft.

19 Claims, 8 Drawing Sheets

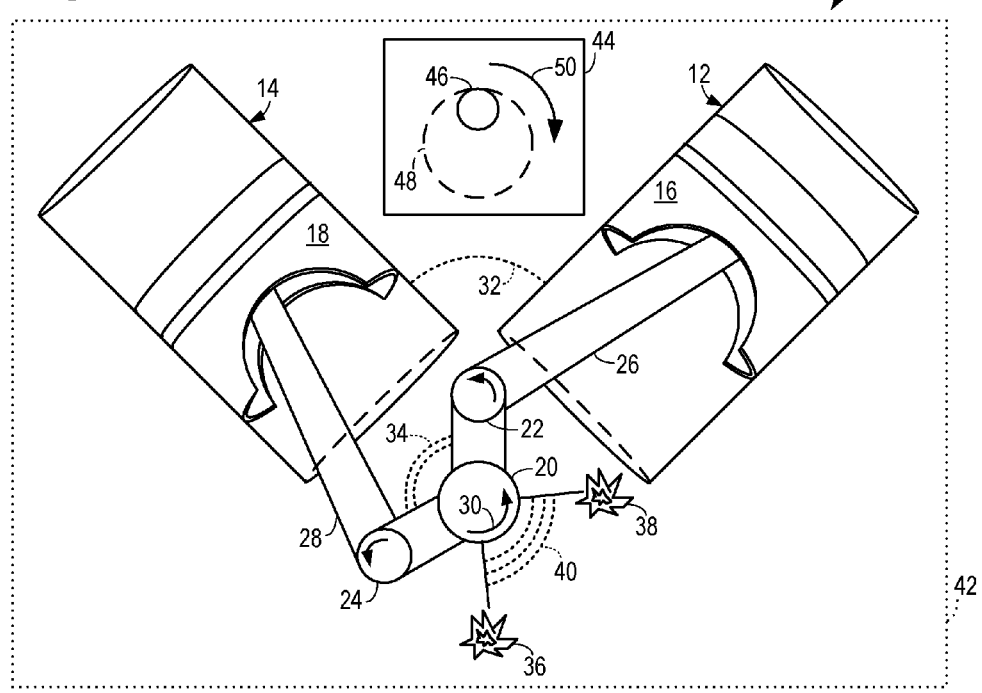
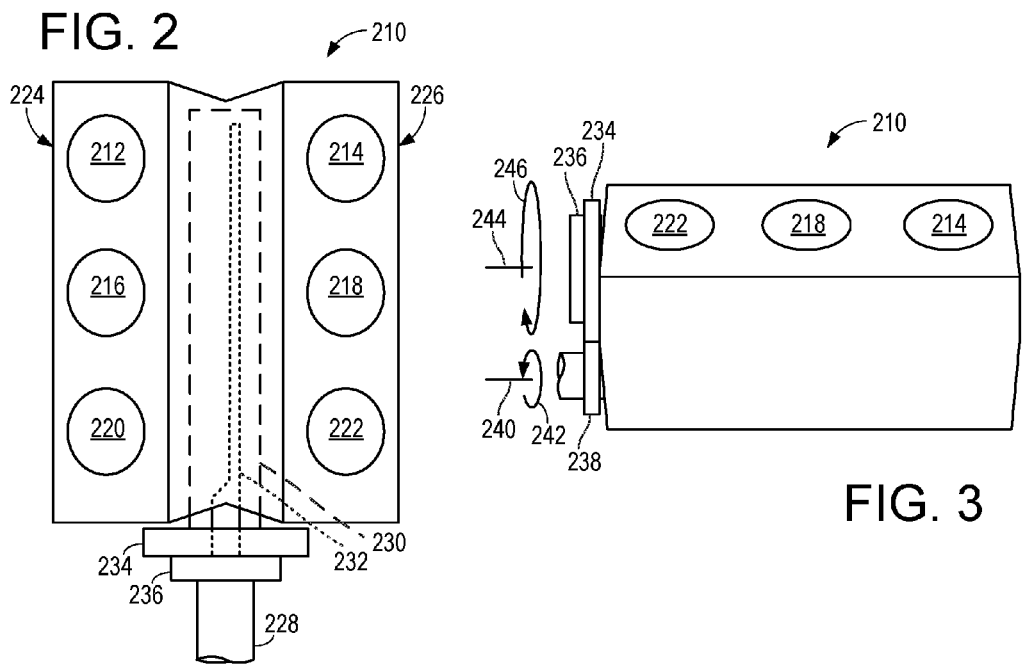

ENGINE BALANCE MASSES AND DRIVES

CROSS REFERENCE TO RELATED APPLICATIONS

The present application is a continuation of U.S. patent application Ser. No. 12/567,401 filed Sep. 25, 2009, now U.S. Pat. No. 8,210,148 the entire contents of which are incorporated herein by reference for all purposes.

TECHNICAL FIELD

The present application relates to a balance mass in an engine, and more particularly, to a drive for the balance mass in an engine.

BACKGROUND AND SUMMARY

The rotational motion of a crankshaft in an engine, along with additional connected mechanical parts such as crankpins, connecting rods and the like may produce unbalanced inertial moments and/or forces. These moments and/or forces may lead to undesirable noise vibration and harness for a vehicle operator.

One approach to balancing the inertial moments and/or forces includes providing a balance shaft rotating along an axis parallel to the crankshaft, and in a direction opposite of the crankshaft. However, the inventors herein recognize various issues related to such an approach. Balance shafts may occupy significant space in an engine block, such as when placed in a valley of a "V" engine, in a cylinder head or in a sump of the engine block. Further, if a balance shaft is disposed in a camshaft, such as in a concentric manner, rotating the balance shaft in the desired direction and at the desired speed may raise issues related to the drive system extending the overall length of the engine, exacerbating packaging space and weight problems.

Accordingly, systems, devices and methods are provided herein. In a first example, an engine includes, a camshaft, a balance shaft disposed within an interior of the camshaft, and a first gear, intermediate the balance shaft and the camshaft, the gear driving the balance shaft to rotate about a first axis substantially parallel to a crankshaft of the engine, the balance shaft further rotating in a direction opposite of the crankshaft.

In this way, it is possible to drive the balance shaft via one or more gears to provide desired rotational speed (e.g., to match the timing of the crankshaft) and reduce packaging space. Further, the first example may include additional gears configured as a planetary gear set.

In a second example, a balance mass and drive for an engine includes, a planetary gear set including a sun gear, a ring gear and a plurality of pinions mounted on a carrier, the ring gear having an interior that meshes with a first pinion of the plurality of pinions, an input coupled to an input gear of the planetary gear set, the input gear being one of the ring gear, the carrier or the sun gear, a balance mass coupled to an output gear of the planetary gear set, the output gear including one of the ring gear, the carrier, or the sun gear, the output gear different form the input gear and configured to drive the balance mass to rotate about a first axis substantially parallel to the crankshaft in a direction opposite of the crankshaft.

By utilizing a planetary gear set, it is possible to provide a compact drive that minimizes weight and packaging space of the balance mass and drive while enabling the balance mass (such as a balance shaft) to be driven at a desired speed and in a desired direction. The balance mass may include balance shafts disposed in a camshaft as well as additional masses such as weighted gears or pendulums included in the output gear, providing flexible placement of the balance mass and drive and easy adaption of such a balance mass and drive across a range of engine configurations (including "V" configurations, "I" configurations, 3, 4, 5, 6, 8, 10 and 12 cylinder engines, etc.).

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

FIG. 1 shows aspects of an example engine including a balance system.

FIG. 2 shows a top down view of an example engine.

FIG. 3 shows a side perspective view of the engine of FIG. 2.

DETAILED DESCRIPTION

Figure 4:
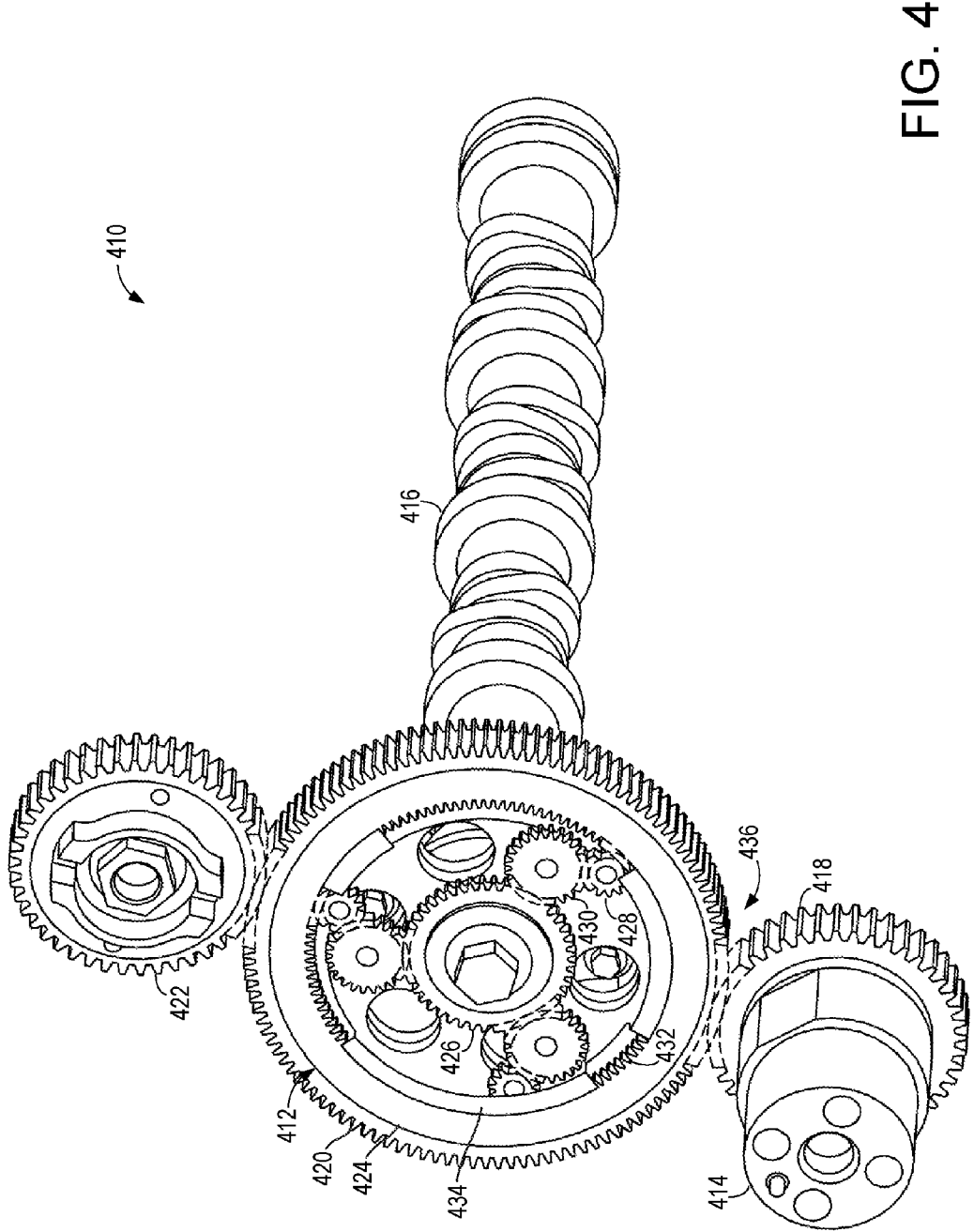
FIG. 4 shows an example engine system including a planetary gear set as a drive for a balance mass.

As one example, FIG. 1 shows aspects of an engine 10 (such as a diesel or gasoline engine) which may be included in a vehicle. Engine 10 may have a plurality of cylinders, including two cylinders, first cylinder 12 and second cylinder 14, each cylinder including a piston (16 and 18, respectively). Combustion of fuel within cylinder 12 drives first piston 16; likewise, combustion of fuel within second cylinder 14 drives second piston 18. Pistons 16 and 18 are coupled to a crankshaft 20 at first and second crank pins 22 and 24 via first and second connecting rods 26 and 28. In this way a cylinder (e.g., 12 or 14) may be coupled to the crankshaft 20 and drive the crankshaft 20 via combustion. Crankshaft 20 is shown begin driven in a first direction, one example of which is a counter-clockwise direction 30, about a first axis perpendicular to the page. Further examples of engine 10 include crankshaft 20 rotating in a clockwise direction.

Cylinders 12 and 14 may each be included in one of two banks of cylinders in a "V" formation, as discussed in further detail below, at the least with respect to FIG. 2. A first angle 32 between the cylinders is shown as 90 degrees. Further examples of engine 10 include additional first angles 32, such as 45, 60, 72 and 120 degrees. Further, crank pins 22 and 24 may be separated by a second angle 34. In the present example, the second angle 34 is 120 degrees and is therefore different from the first angle. In further examples, second angle 34 may be different amounts other than 120 degrees and may be equal to first angle 32. Furthermore, in examples of engine 10 that include more than two cylinders an angle between crank pins of successive cylinders may vary.

As fuel is combusted in engine 10, a time elapses between a first combustion event 36 and a second combustion event 38. A firing interval may be measured as a third angle 40, the third angle being an amount of degrees that the crankshaft 20 rotates between combustion events 36, and 38. In examples of engine 10 that include two or more cylinders, engine 10 may have a firing order to determine an ordinality of combustion events within the cylinders of the engine 10. Engine 10 may include a firing order based on the number of cylinders, angles between cylinders banks (e.g., 32) and angles between crank pins (e.g., 34), examples of which are discussed in further detail, at the least with respect to FIG. 2. Further firing intervals between successive combustion events within the firing order may be non-constant, for example in an uneven firing order. In some such examples angle 40 may only be the interval between first combustion event 36 and second combustion event 38, and may not be equal to an interval between second combustion event 38 and a third combustion event (not shown).

Motion of the elements and components of engine 10 (e.g., pistons 16, and 18 connecting rods 26, and 28 crank pins 22, and 24 and crankshaft 20) may be translational and rotational. Translational motion of engine 10, as well as rotational moments (e.g., primary and/or secondary moments) of engine 10 may generate noise, vibration and harness (NVH). In one example, as the engine 10 changes speed, rotational inertia may generate torques in the engine, leading to NVH. In a further example, translational or rotational motion of engine 10 may generate NVH because of forces between moving parts and parts coupled to the engine but at rest with respect to the example vehicle, such as an engine mounting system (shown symbolically at box 42). In this way, unbalanced forces in the engine 10 may lead to NVH concerns that increase wear and decrease drivability of a vehicle.

Some NVH concerns may be mitigated by counter balancing weights attached to crankshaft 20, crank pin separation (e.g., angle 34), firing interval (e.g., angle 40) and dampening systems and devices integrated into the engine mounting system 42. In some additional example engines, the use of a particular cylinder bank angle (e.g., 60, 72 or 90 degrees in a V6 engine) may lead to a complicated and heavy crankshaft if no further engine system or device is included in the engine to balance the motion of the crankshaft and its connected elements and components.

In the present example, unbalanced forces within engine 10 are mitigated at least in part by balance system 44, including balance mass 46. In the present example, a drive 48, coupled to balance mass 46 rotates the mass 46 in a clockwise direction 50, opposite the direction 30 of crankshaft 20. Additionally, balance mass 46 may rotate in a counter-clockwise direction. Further, rotation of the balance mass 46 may be about an axis substantially parallel to an axis of rotation of the crankshaft 20, and may further be substantially parallel to the crankshaft 20. A rotating balance mass 46 may have its own moments of inertia, and may further be timed in accordance with the rotation of the crankshaft 20 to cancel one or more forces within the engine 10.

Drive 48 may be a planetary gear set, as described in examples below. Additionally, example balance masses 46 (also described below) may be balance shafts, pendulums or further devices that when rotated produce inertial moments and/or forces.

FIG. 2 shows a top down view of an example engine 210, which is one example of engine 10 described above with respect to FIG. 1. Engine 210 includes six cylinders 212-222. Engine 210 further includes crankshaft 228, camshaft 230 and a balance mass configured as a balance shaft 232, the balance shaft 232 disposed within an interior of a camshaft 230.

Cylinders 212, 216 and 220 are arranged in first cylinder bank 224 and cylinders 214, 218 and 222 are arranged in second cylinder bank 226, both cylinder banks 224 and 226 separated by 90 degrees and forming a "V" configuration engine. Further examples of engine 210 include additional angles of separation, such as 45, 60, and 120, as well as additional configurations such as V8, V10, I4 and I6.

Turning now to FIG. 3, a side perspective view of engine 210 is shown. Engine 210 further includes a cam gear 234, balance drive 236 and crank gear 238. Crankshaft 228 rotates about axis 240 in counter-clockwise direction 242. In the present example, crankshaft 228 further includes crank gear 238 which is shown meshing with cam gear 234. In one example, the balance drive includes a first gear, intermediate the balance shaft 232 and the camshaft 230, the gear driving the balance shaft to rotate about a first axis (e.g., axis 244) substantially parallel to the crankshaft 228 of the engine 210, the balance shaft 232 further rotating in a direction (e.g., clockwise direction 246) opposite of the crankshaft 228. Further, drive 236 may be intermediate to the camshaft 230 by meshing with the cam gear 234. In additional examples, drive 236 may couple to the crankshaft 228, for example, via the crank gear 238.

In some examples, engine 210 has a firing order, example firing intervals, example crank pin angles, and/or example angles between engine banks that lead to a primary moment of inertia. In one example the primary moment of inertia is not balanced by crankpins and/or weights added to the crankshaft. Instead, drive 236 rotates balance shaft 232 at a speed equal to crankshaft 228 about an axis substantially parallel to crankshaft 228. Because balance shaft 232 rotates in a direction opposite of crankshaft 228, it generates a moment in the opposite direction as crankshaft 228, substantially balancing the forces/moments in the engine 210 created by the primary moment of the crankshaft 228.

In further examples, drive 236 may rotate balance shaft 232 at a speed twice that of the crankshaft 228. Consequently, secondary moments of the crankshaft, for example as a result of the rotation of example crank pins, may be mitigated and/or balanced. In this way, balance shaft 232 may rotate at various speeds, producing various moments of inertia. Further still, the shape of balance shaft 232 may produce varying moments (further examples of which are discussed with regard to FIGS. 4-9 and 19-22).

FIG. 4 shows aspects of an example engine system 410. Engine system 410 includes a planetary gear set 412 which is one example of a drive for balance mass, the drive including a first gear for rotating a balance mass, as discussed above. The engine system 410 includes an example crankshaft 414, coupled to an example camshaft 416, by meshing a crank gear 418 with a cam gear 420. Consequently, the cam gear is driven by the crank gear to rotate camshaft 416, fuel pump gear 422, and ring gear 424. In some examples, fuel pump gear 422 drives a high pressure fuel pump that provides fuel to a direct injection fuel injector of the engine system 410.

Planetary gear set 412 includes a sun gear 426, the ring gear 424 and a plurality of pinions (including first pinions 428 and second pinions 430). The plurality of pinions 428 and 430 may be mounted on a carrier (as shown below, with respect to FIG. 5). Further, in the present example the ring gear 424 has an interior 432 that meshes with each of the first pinions 428. The ring gear is driven by the cam gear; as a result the ring gear may be an input gear of the planetary gear set.

The present example also includes an optional guide 434, retaining the first pinions 428 toward the direction of the camshaft 416. Also in the present example, first pinions 428 mesh with second pinions 430, which in turn mesh with the sun gear 426 and drive the sun gear 426. The sun gear may be an output gear of the planetary gear set 412 and further, may be coupled to a balance shaft (as shown, for example, in FIG. 8). In this way, planetary gear set 412 may be configured to drive an example balance mass to rotate about a first axis substantially parallel to the crankshaft. Additionally, a balance mass may be integrated into the sun gear 426 (as discussed in more detail below with respect to FIGS. 12-15). Any rotating mass has moments of inertia; however, a gear including for example, a hollowed-out portion or a portion of increased-density material may have a specifically desired moment. Further, such a balance mass may be a pendulum extending out from the sun gear 426. Further, the inclusion of the first and second pinions in the present example results in the planetary gear set 412 driving such a balance mass in a direction opposite of the crankshaft.

Further still the sun gear 426 may be geared to rotate at an integer multiple of the angular speed of the crankshaft 414. In a first example, the planetary gear set 412 is geared to rotate the sun gear 426 at the same angular velocity and/or radial speed as the crank gear 418. In such an example, the circumference of the sun gear 426 may be equal to the circumference of the crank gear 418. In a second example, the planetary gear set 412 is geared to rotate the sun gear 426 at twice the speed of the crank gear 418. In such an example, the circumference of the sun gear 426 may be half the circumference of the crank gear 418.

In the present example, the camshaft 416 may be an input via the cam gear 420 to an input gear (e.g., the ring gear 424). In further examples of engine system 410, the sun gear 426 and the pinions (at 428 and/or 430) driven by an example carrier may be example input gears. Further still, the crankshaft 416 may be an input to the input gear of the planetary gear set 412. Also in the present example the sun gear 426 is an example output gear coupled to a balance mass (not shown). In additional examples, the ring gear 424 and the pinions 428 and 430 may be example output gears. Also, though the present example only shows gears meshing directly via teeth or cogs (e.g., at 436 where the crank gear 418 meshes with the cam gear 420), in additional examples other mechanical links (such as a chain) may be included in engine system 410.

Figure 5:
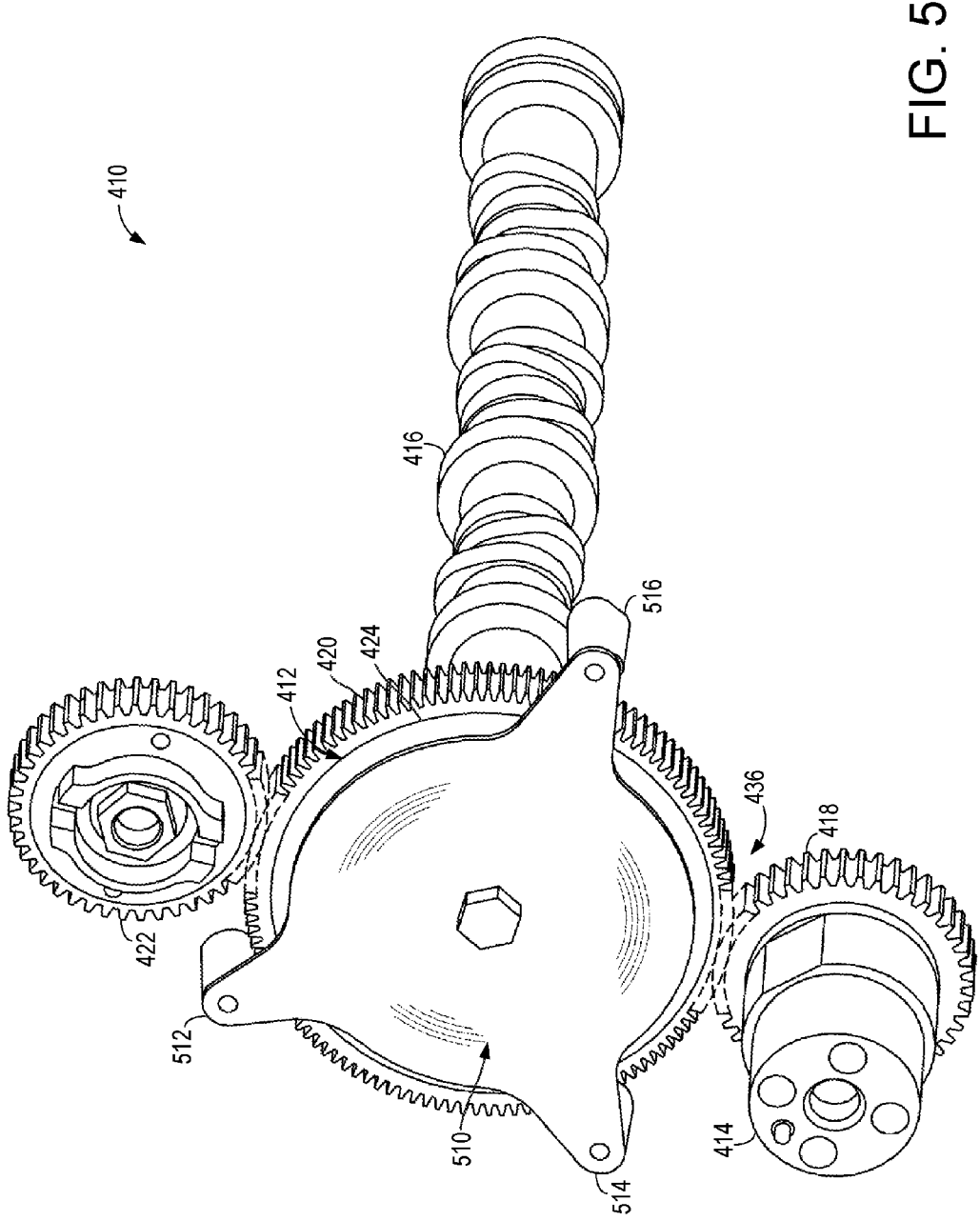
FIG. 5 shows the engine of FIG. 4 including a carrier.

Turning now to FIG. 5, the engine system 410 is shown including a carrier 510. In the present example, an example plurality of pinions (such as at 428 and 430 shown in FIG. 4) may be mounted to carrier 510. In the present example, the plurality of pinions may rotate but do not substantially move relative to an engine block (not shown), to which the carrier is mounted. The carrier 510 may include a spider type mount (such as at 512, 514 and 516) to position and retain the carrier adjacent to the example engine block. Further examples of engine system 410 may include a mounting for an example ring gear or sun gear (e.g., 424 and 426 respectively), and the carrier 510 may be one of an input or an output gear.

Figure 6:
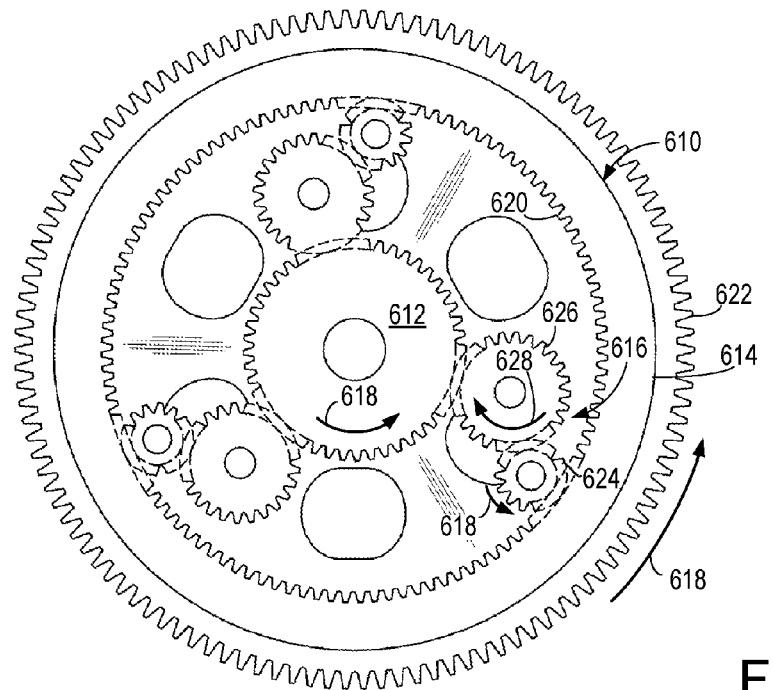
FIG. 6 shows an example planetary gear set including a sun gear, a ring gear, and a plurality of twin pinions.

FIG. 6 shows an example planetary gear set 610, which may be used in engine system 410, including a sun gear 612, a ring gear 614, and a plurality of twin pinions 616. Sun gear 612 is configured to rotate in the rotational direction 618. Rotational direction 618 may be about an axis substantially parallel to an example crankshaft but opposite the rotation of such a crankshaft. Sun gear 612 may be coupled directly to a balance mass, such as a balance shaft, without any gear intermediate to drive the balance mass. Ring gear 614 may have a toothed interior 620. Further, ring gear 614 may be driven by a cam gear 622, and may also rotate in a direction 618.

Figure 7:
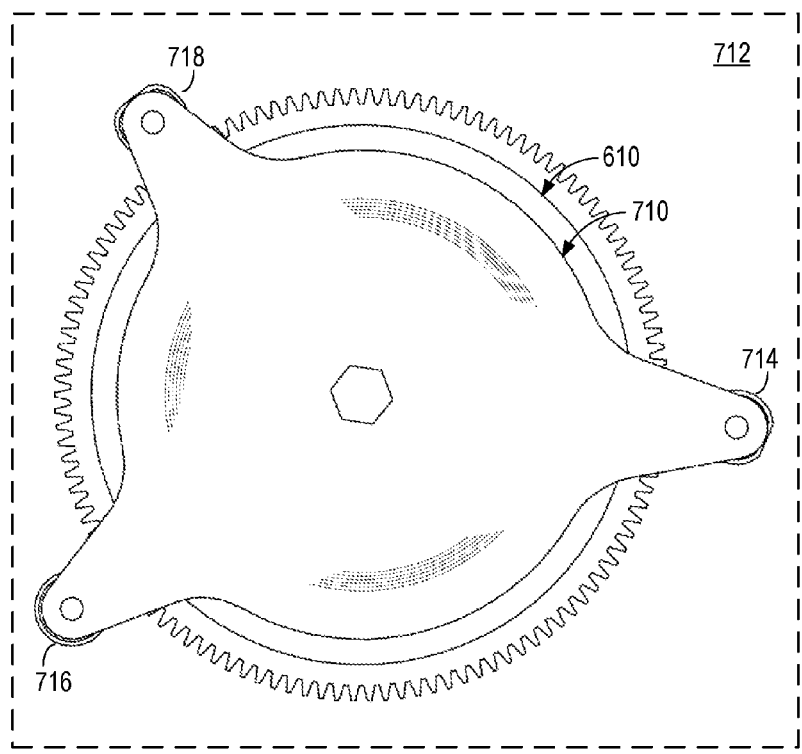
FIG. 7 shows the planetary gear set of FIG. 6 further including a carrier mounted to an engine block.

The plurality of twin pinions 616 may be coupled to an example carrier (as described with respect to FIGS. 5 and 7). Further, in the present example, each twin pinion 616 includes a first pinion 624 meshing with the interior of the ring gear 614 and a second pinion 626 different from the first pinion 624 and meshing with the first pinion 624 and sun gear 612. In the present example, second pinion 626 is shown rotating in a direction 628 opposite the sun gear 612, driving the sun gear 612 in direction 618. In this way the inclusion of the twin pinions may control the direction of an output gear, such as the sun gear. Further examples of planetary gear set 610 may include only a single pinion, meshing with the ring gear 614 and the sun gear 612.

Further, the ratios of sizes between the sun gear, ring gear 614, and plurality of twin pinions 616, and the choice of which gears are input and output gears may determine an epicyclic gear ratio between input and output gears, according to known planetary gearing techniques. In the present example, the sun gear 612 is an output gear and the ring gear is an input gear 614. The ratio between gears implies that for every turn of the ring gear 614, the sun gear 612 turns A/S times, where A is the number of teeth or cogs along the interior 620 of the ring gear and S is the number of teeth along the sun gear 612. In one example sun gear 612 includes 105 teeth and ring gear 614 includes 210 teeth, resulting in the sun gear 612 turning twice for every turn of the ring gear 614. Further, if the size of the teeth is constant across gearing, the circumference (and radius) of the sun gear is one half that of the interior of the ring gear.

In a first example, the epicyclic gear ratio between an example input gear of the planetary gear set 610 and an example output gear drives an example balance mass to rotate at a speed twice that of an example crankshaft. In such an example, the ratio of teeth between the ring gear and the sun (e.g., the quantity A/S) is 4, so that the sun gear 612 rotates 4 times for every rotation of the ring gear 614. In this way the timing of a secondary moment of the example crankshaft and connected components and elements, having a frequency twice that of the rotation of the example crankshaft, may be matched by the output gear coupled to a balance mass. In a second example, the epicyclic gear ratio between the input gear and the output gear drives the balance mass to rotate at a speed equal to that of the crankshaft. Similarly, the timing of a primary moment of the example crankshaft and connected components and elements may be matched by output gear.

FIG. 7 shows a further view of planetary gear set 610 including a carrier 710 mounted to an engine block 712 via a spider type mount at 714, 716 and 718. The carrier 710 is mounted to the engine block 712 such that the plurality of twin pinions 616 may rotate but do not substantially move relative to the engine block 712. In further examples of planetary gear set 610, the carrier 710 may be coupled to further gears or shafts for use as an input gear or an output gear. In such examples, an example sun gear e.g., 612 or ring gear 614 may be mounted to the engine block 712 so that they do not rotate relative to the engine block 712.

Figure 8:
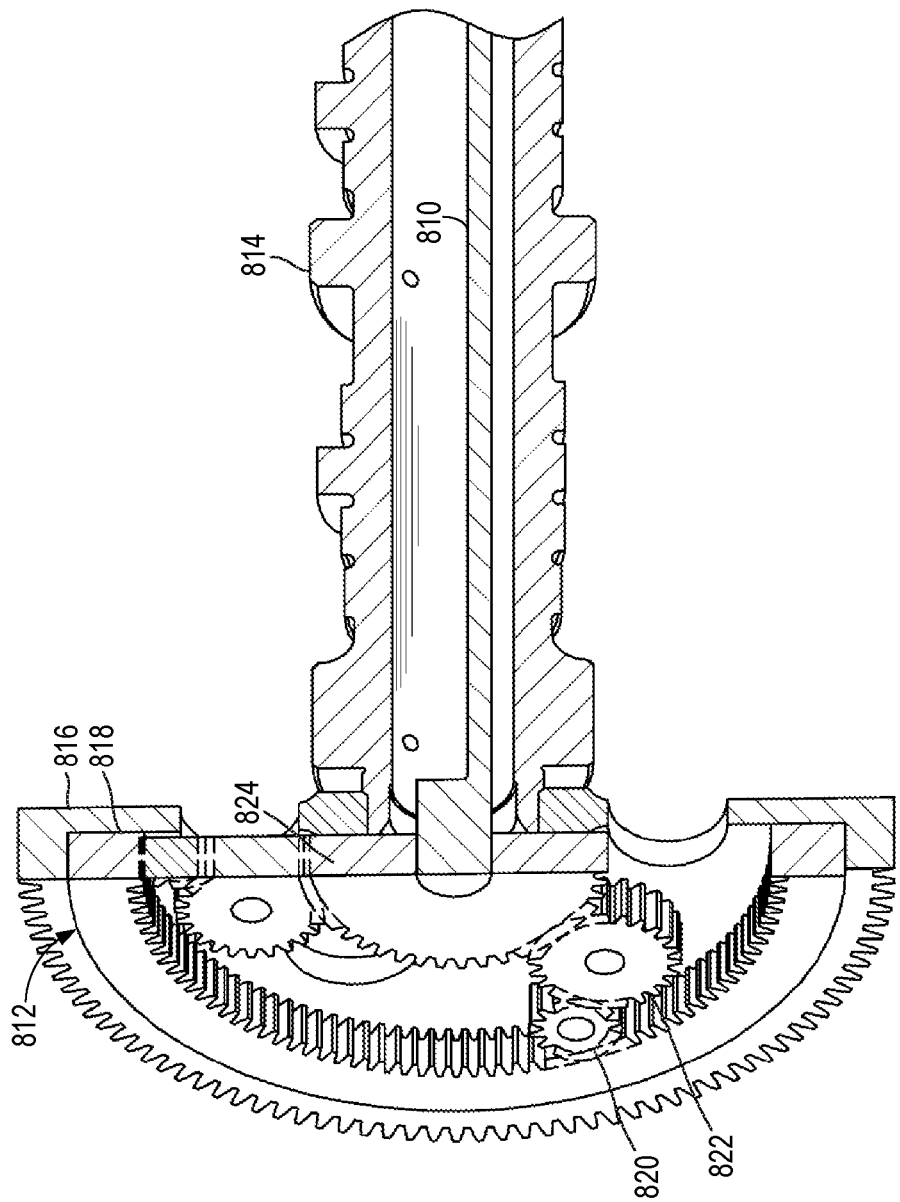
FIG. 8 shows an example balance shaft and drive, including a planetary gear set.

FIG. 8 shows an example balance shaft 810 and drive, including a planetary gear set 812, which may be used in engine system 410. The balance shaft 810 is disposed inside a camshaft 814. As described above, a cam gear 816 is an input to an input gear, ring gear 818. Ring gear 818 communicates with at least a first pinion 820, which in turn communicates with a second pinion 822, the second pinion driving a sun gear 824. The sun gear 824 is directly coupled to a balance mass, configured as balance shaft 810, and rotates the balance shaft 810 about an axis parallel to an example crankshaft, but in a direction opposite the crankshaft.

Figure 9:
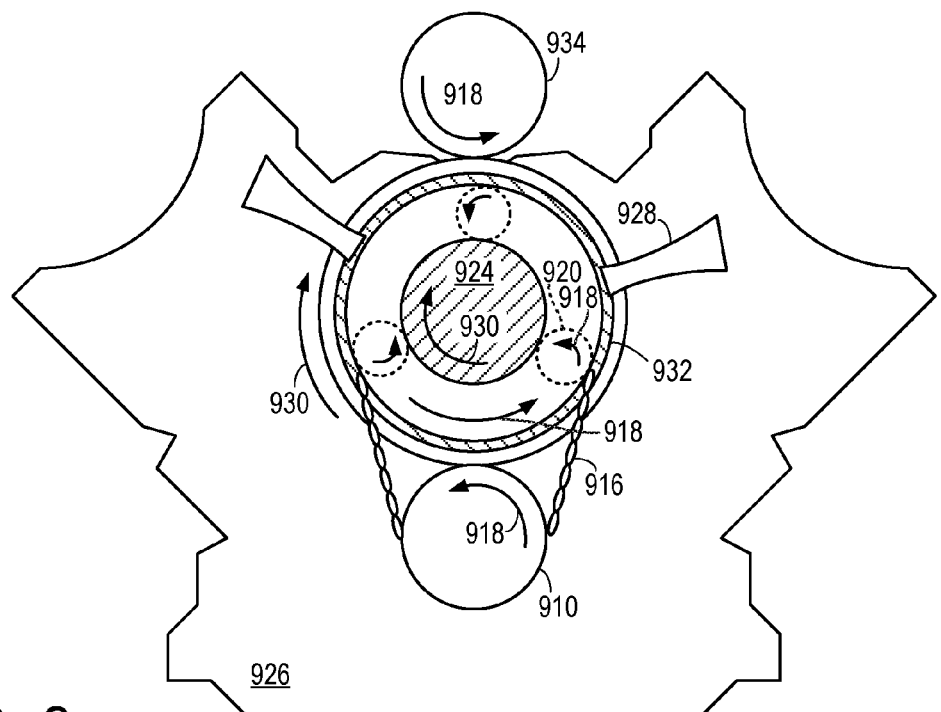
FIG. 9 shows an additional example drive for a balance mass.

FIG. 9 shows an additional example drive for a balance mass, which may be used in the example engines herein. In the present example, a crankshaft 910 may be an input coupled to a carrier 912 which may be an input gear of a planetary gear set 914. In the present example the crankshaft 910 is coupled to the carrier 912 via a chain 916. As the crankshaft rotates in a first direction 918, so does the carrier, which in turn drives pinions 920. Pinions 920 mesh with ring gear 922 and sun gear 924. In the present example, ring gear 922 is mounted to the engine block 926 via spider mounts 928, such that it does rotate relative to the engine block 926. The pinions 920 drive sun gear 924 in direction 930, a second direction opposite of 918. The sun gear 924 may be an output gear coupled to a balance mass, such as a balance shaft disposed inside an example camshaft (as described above). The gearing of the planetary gear set 914 may drive the sun gear at a speed twice that of the crankshaft 910 to substantially mitigate a secondary moment of the crankshaft 910. In the present example, the cam gear 932 is not coupled directly to the planetary gear set 914, though it may drive fuel pump gear 934.

Figure 10:
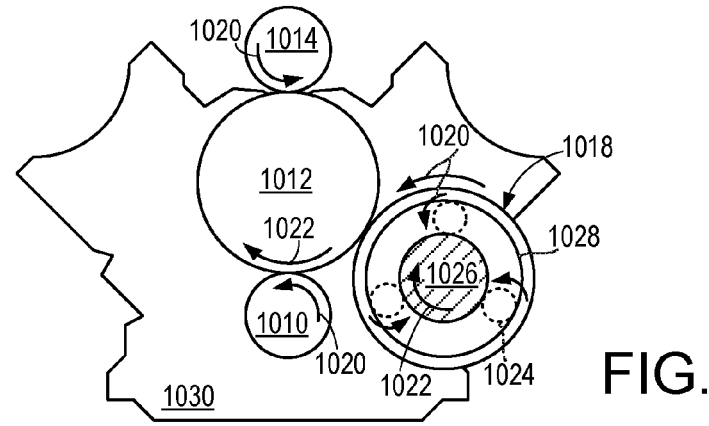
FIG. 10 shows a further example drive for a balance mass.

FIG. 10 shows further example drive for a balance mass that may be used with the example engines described herein. In the present example, a crankshaft 1010 drives an example cam gear 1012. Cam gear 1012 meshes with a fuel pump gear 1014 and an exterior of a ring gear 1016 of a planetary gear set 1018. As the crankshaft rotates in a first direction 1020, it drives cam gear 1012 in the opposite direction 1022. Further, as rotational energy is transferred between gears, pinions 1024 mesh with ring gear 1016 and sun gear 1026 to drive the sun gear 1026 in direction 1022. In the present example a carrier 1028 is mounted to the engine block 1030 such that it does not rotate relative to the engine block 1030, and such that the pinions 1024 may rotate. In the present example the sun gear 924 may be an output gear coupled to a balance mass, such as an example balance shaft disposed inside engine block 1030. In further examples, a balance shaft may be disposed in a sump, valley, or cylinder head of the engine block 1030. Further still, the balance mass may be integrated into planetary gear set 1018, as described below with respect to FIGS. 12-15.

Figure 11:
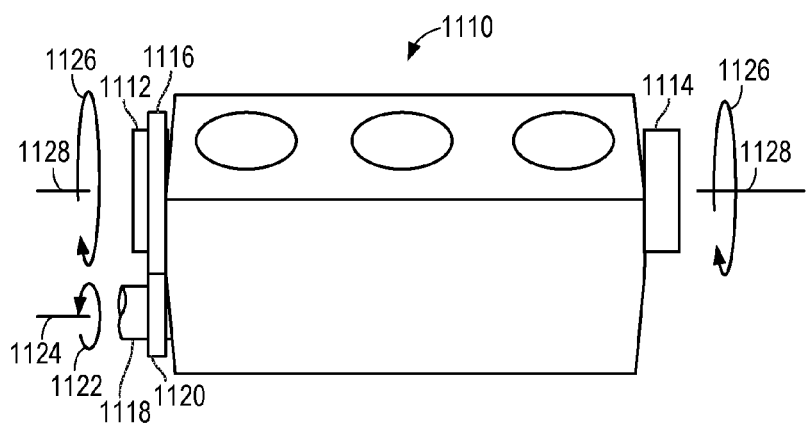
FIG. 11 shows a further example engine including two balance mass drives.

FIG. 11 shows a further example engine 1110 including two drives, first drive 1112 and second drive 1114. In the present example, each drive 1112 and 1114 includes a first gear and may be a planetary gear set, as described above, with one planetary gear set on one end of the engine 1110 and the other planetary gear set on the other end of the engine 1110. In the present example, each drive 1112 and 1114 is coupled to an example camshaft (e.g., first drive 1112 coupled via cam gear 1116). In further examples, the drives may be coupled to a balance shaft and/or crankshaft 1118. As described above, the rotation of crankshaft 1118 is transferred to cam gear 1116 via crank gear 1120. Although inclusion of two drives may lengthen the engine 1110, a camshaft may have a smaller diameter because it may not include a balance shaft.

Further, the present example may offer increased flexibility with regards to moments that may be generated to counter those of the crankshaft 1118. Crankshaft 1118 may rotate in a first direction 1122 about axis 1124. First and second drives 1112 and 1114 may rotate two example balance masses attached or integrated into output gears of the drives in direction 1126 (opposite direction 1122) but about axis 1128 parallel axis 1124. Such balance masses may be separated by at 180 degrees of crankshaft rotation and be different amounts of mass. The choice of mass amount and location may be determined by the number of cylinders of engine 1110, the shape of crankshaft 1118, firing order, etc.

Figure 12:
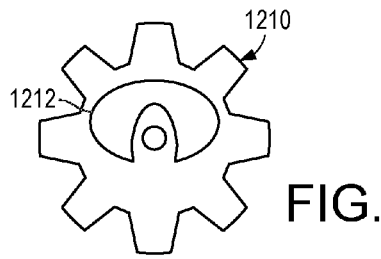
FIG. 12 shows a first example gear.
Figure 14:
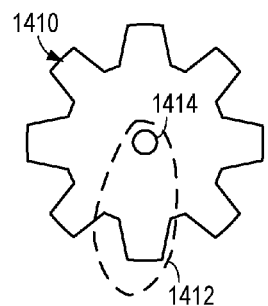
FIG. 14 shows a third example gear.
Figure 13:
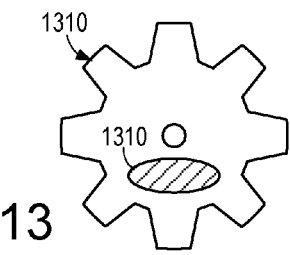
FIG. 13 shows a second example gear.
Figure 15:
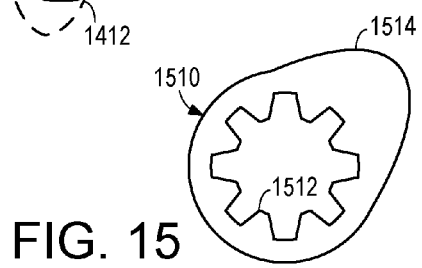
FIG. 15 shows a fourth example gear.

FIGS. 12-15 show example gears that include a balance mass integrated into the gears, and that may be used with the example engines described herein. Further, FIGS. 12-15 are non-limiting examples of such gears and it should be understood that further such examples may be include in example balance mass drives such as the planetary gear sets described above. FIG. 12 shows an example balance mass integrated into a gear 1210 via a hollowed-out portion 1212, which creates an uneven distribution of mass across gear 1212. FIG. 13 shows an example balance mass integrated into a gear 1310 via a portion of increased-density material 1312, in contrast to the material of the rest of the gear 1310. FIG. 14 shows an example balance mass included in a gear 1410, where the balance mass includes a pendulum 1412 extending out from bore 1414 which is concentric with an axis of rotation of the gear. Further, FIG. 15 shows a gear 1510 with a toothed interior 1512 (such as an example ring gear) that further includes a lobe 1514, which is one example of a balance mass.

Figure 16:
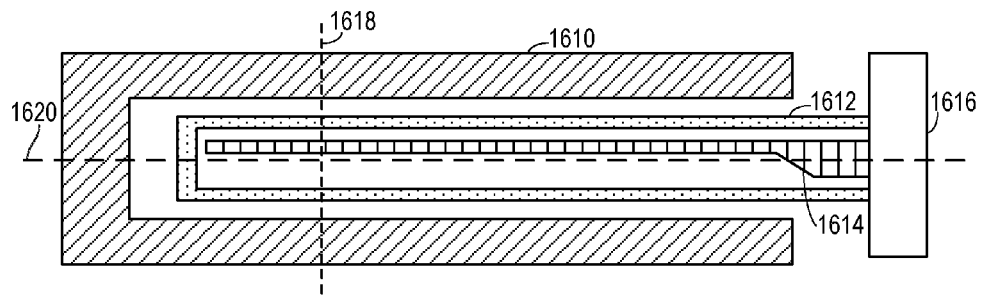
FIG. 16 shows aspects of an example portion of an engine block including an example camshaft with an example balance shaft disposed within.

FIG. 16 shows aspects of an example portion of an engine block 1610 including an example camshaft 1612 with an example balance shaft 1614 disposed within, driven by example drive 1616. Further, engine block portion 1610 may include further supports (such as bearings) intermediate the block and the camshaft as well as intermediate the balance shaft and the camshaft.

Figure 17:
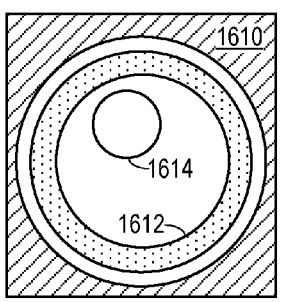
FIG. 17 shows a cross-section of a first example balance shaft.
Figure 18:
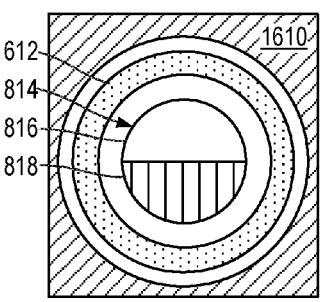
FIG. 18 shows a cross-section of a second example balance shaft.
Figure 19:
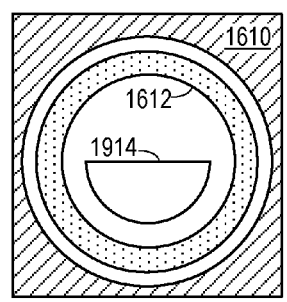
FIG. 19 shows a cross-section of a third example balance shaft.

FIGS. 17-21 are meant as non-limiting examples of balance shafts to illustrate the wide variety of example balance shafts that may be included in the example engines described herein and driven by the drives described herein. Further, FIGS. 17-19 show cross-sections taken along line 1618. FIGS. 17-19 show example balance shafts (e.g., 1614, 1814, and 1914) configured such that when rotated, they generate a moment of inertia about an axis of rotation 1620, substantially parallel to an example crankshaft. Each figure shows a cross-section of engine block 1610 and camshaft 1612. Turning first to FIG. 17, the first example balance shaft 1614 shaped as a cylindrical rod which is not concentric with the camshaft 1612 as also shown in FIG. 16. FIG. 18 shows a second example balance shaft 1814 substantially concentric with the camshaft 1612. Second example balance shaft 1814 includes a first half cylinder 1816 including a first material, and a second half cylinder 1818 of a second material, coupled together. The first and second materials include materials of different densities, yielding an uneven distribution of mass across the balance shaft 1812. FIG. 19 shows a third example balance shaft 1914 which is a single half cylinder.

Figure 20:
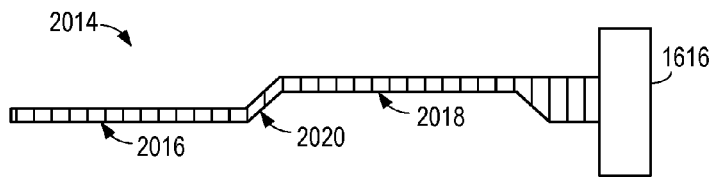
FIG. 20 shows an example balance shaft with a non-constant (varying) cross-section.
Figure 21:
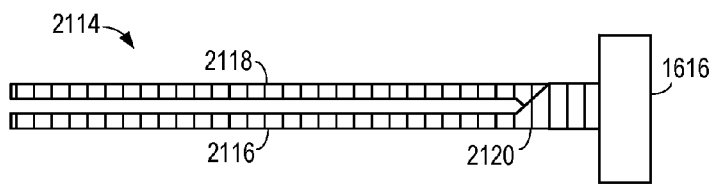
FIG. 21 shows an additional balance shaft with a non-constant (varying) cross-section.

FIGS. 20 and 21 show additional example balance shafts 2014 and 2114 with non-constant cross-sections, coupled to example drive 1616. FIG. 20 shows an example balance shaft 2014 with a first section 2016 joined to a second section 2018 via a kink 2020. FIG. 21 shows a further example balance shaft 2114, including first arm 2116 and second arm 2118 coupled to each other at 2120.

Figure 22:
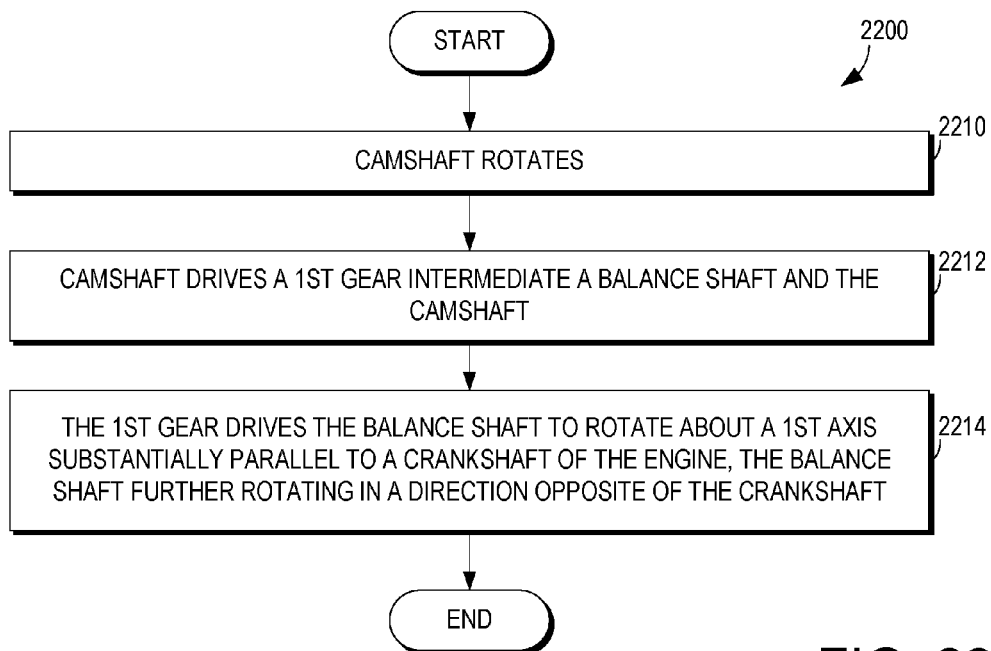
FIG. 22 illustrates methods for balancing moments and/or forces within an example engine.

FIG. 22 illustrates an example method 2200 for balancing moments and/or forces within an example engine. At 2210 the method 2200 includes an example camshaft rotating. In some examples of method 2200 the camshaft may be an input for an input gear of a drive for an example balance mass. Method 2200 continues to 2212 which includes the camshaft driving a first gear intermediate a balance shaft and the camshaft. After 2212 the method 2200 includes the first gear driving the balance shaft to rotate about a first axis substantially parallel to a crankshaft of the engine, the balance shaft further rotating in a direction opposite of the crankshaft It will be appreciated that the first gear of method 2200 may be one example of an input gear or an output gear. Further the first gear may be directly coupled to one or both of the balance shaft and the camshaft. Additional gears may be included within the engine that are intermediate the first gear and the camshaft or the first gear and the balance shaft.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system. It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. An engine comprising:
a first cylinder bank and a second cylinder bank both coupled to a crankshaft;
a camshaft;
a balance shaft disposed within an interior of the camshaft; and
a first gear, intermediate the balance shaft and the camshaft, the first gear driving the balance shaft to rotate about a first axis substantially parallel to the crankshaft, the balance shaft rotating in a direction opposite the crankshaft.

2. The engine of claim 1, where the first gear is included in a planetary gear set.

3. The engine of claim 2, wherein the planetary gear set includes a sun gear, a ring gear and a plurality of pinions mounted on a carrier.

4. The engine of claim 3, where the sun gear is directly coupled to the balance shaft without any gears in between, and the first gear is one of the carrier, the ring gear or the sun gear.

5. The engine of claim 1 wherein the first bank and the second bank are in a V-configuration.

6. A balance mass and drive for an engine comprising:
a crankshaft coupled to a first cylinder bank and a second cylinder bank;
a planetary gear set including a sun gear, a ring gear and a plurality of pinions mounted on a carrier, the ring gear having an interior that meshes with a first pinion of the plurality of pinions;
an input coupled to an input gear of the planetary gear set, the input gear being one of the ring gear, the carrier, or the sun gear; and
a balance mass coupled to an output gear of the planetary gear set, the output gear including one of the ring gear, the carrier, or the sun gear, the output gear different from the input gear and configured to drive the balance mass to rotate about a first axis substantially parallel to the crankshaft in a direction opposite the crankshaft.

7. The balance mass and drive of claim 6, where an epicyclic gear ratio between the input gear and the output gear drives the balance mass to rotate at a speed twice that of the crankshaft.

8. The balance mass and drive of claim 6, where an epicyclic gear ratio between the input gear and the output gear drives the balance mass to rotate at a speed equal to that of the crankshaft.

9. The balance mass and drive of claim 6, where the balance mass includes a pendulum extending out from the first axis.

10. The balance mass and drive of claim 6, where the balance mass is a balance shaft disposed within an interior of a camshaft.

11. The balance mass and drive of claim 6, where the balance mass is integrated into the output gear.

12. The balance mass and drive of claim 6, where the input is coupled to the input gear directly via meshing teeth or cogs.

13. The balance mass and drive of claim 6, where the input is coupled to the input gear via a chain.

14. The balance mass and drive of claim 6, where the input includes at least one of a camshaft and a cam gear.

15. The balance mass and drive of claim 6, where the input includes the crankshaft of the engine.

16. The balance mass and drive of claim 6, where the first pinion meshes with an exterior of the sun gear.

17. An engine comprising:
first and second cylinder banks in a V-configuration coupled to a crankshaft;
a camshaft sharing an axis of a planetary gear set's sun gear;
a balance shaft on the axis; and
a first gear of the planetary gear set intermediate the balance shaft and the camshaft, the first gear driving the balance shaft to rotate about a first axis substantially parallel to, and in an opposite direction to, the crankshaft.

18. The engine of claim 17 wherein, the planetary gear set includes the sun gear, a ring gear and a plurality of pinions mounted on a carrier with the pinions radially around the camshaft.

19. The engine of claim 18, where the sun gear is directly coupled to the balance shaft without any gears in between, and the first gear is the sun gear.

* * * * *